United States Patent [19]

Griffiths

[11] Patent Number: 4,789,005

[45] Date of Patent: Dec. 6, 1988

[54] MARINE GROWTH RETARDING HOSE

[75] Inventor: Alan D. Griffiths, New Waltham, England

[73] Assignee: Dunlop Limited, United Kingdom

[21] Appl. No.: 170,704

[22] Filed: Mar. 14, 1988

Related U.S. Application Data

[63] Continuation of Ser. No. 94,096, Sep. 4, 1987, abandoned, which is a continuation of Ser. No. 861,343, May 9, 1986, abandoned.

[30] Foreign Application Priority Data

May 17, 1985 [GB] United Kingdom ............ 8512575

[51] Int. Cl.$^4$ .................. B63B 59/04; F16L 58/04
[52] U.S. Cl. .................... 138/103; 138/104; 138/137; 138/145; 138/178; 428/907; 405/157
[58] Field of Search ............ 138/103, 104, 105, 118, 138/137, 140, 145, 177, 178, DIG. 6, 172, 174; 428/36, 907; 405/157

[56] References Cited

U.S. PATENT DOCUMENTS

| | | | |
|---|---|---|---|
| 23,103 | 6/1859 | Mattson | 524/431 X |
| 417,796 | 12/1889 | Taft | 138/127 |
| 682,913 | 9/1901 | Coleman | 428/907 X |
| 1,017,271 | 2/1912 | Subers | 138/130 X |
| 1,651,022 | 11/1927 | Fulton | 138/127 X |
| 1,692,255 | 11/1928 | Fulton | 138/127 X |
| 2,151,307 | 3/1939 | Smith | 138/133 |
| 2,438,146 | 3/1948 | Candee et al. | 138/127 X |
| 2,448,609 | 9/1948 | Malm | 524/431 X |
| 3,070,132 | 12/1962 | Sheridan | 138/118 |
| 3,118,223 | 1/1964 | Schull et al. | 72/47 |
| 3,137,670 | 6/1964 | Maneri | 524/431 X |
| 3,167,126 | 1/1965 | Reineke, Jr. et al. | 138/133 X |
| 3,219,505 | 11/1965 | Hilding | 428/907 X |
| 3,459,233 | 8/1969 | Webbe | 138/131 |
| 3,476,577 | 11/1969 | Davie | 428/907 |
| 3,555,170 | 1/1971 | Petzetakis | 138/103 |
| 3,711,570 | 11/1973 | Coleman | 138/131 |
| 3,908,068 | 9/1973 | MacKenzie, Jr. | 428/389 |
| 4,225,352 | 9/1980 | Makino et al. | 524/431 X |
| 4,377,650 | 3/1983 | Fischer | 524/431 X |
| 4,402,346 | 9/1983 | Cheetham et al. | 138/133 X |
| 4,428,989 | 1/1984 | Marshall | 428/907 X |
| 4,603,653 | 8/1986 | Bews | 428/907 |

FOREIGN PATENT DOCUMENTS

| | | |
|---|---|---|
| 883092 | 1/1980 | U.S.S.R. |
| 373302 | 3/1931 | United Kingdom. |
| 1209474 | 10/1966 | United Kingdom. |
| 1353760 | 6/1971 | United Kingdom. |
| 1457524 | 12/1973 | United Kingdom. |

Primary Examiner—James E. Bryant, III
Attorney, Agent, or Firm—Stevens, Davis, Miller & Mosher

[57] ABSTRACT

A flexible hose suitable for use in seawater contains a small amount of copper dust in its elastomeric cover. The copper dust, even though present in a small amount, inhibits marine growth on the hose and prevents marine creatures boring very far into the hose. The hose is particularly suitable for the transportation of corrosive fluid such as crude oil.

11 Claims, 1 Drawing Sheet

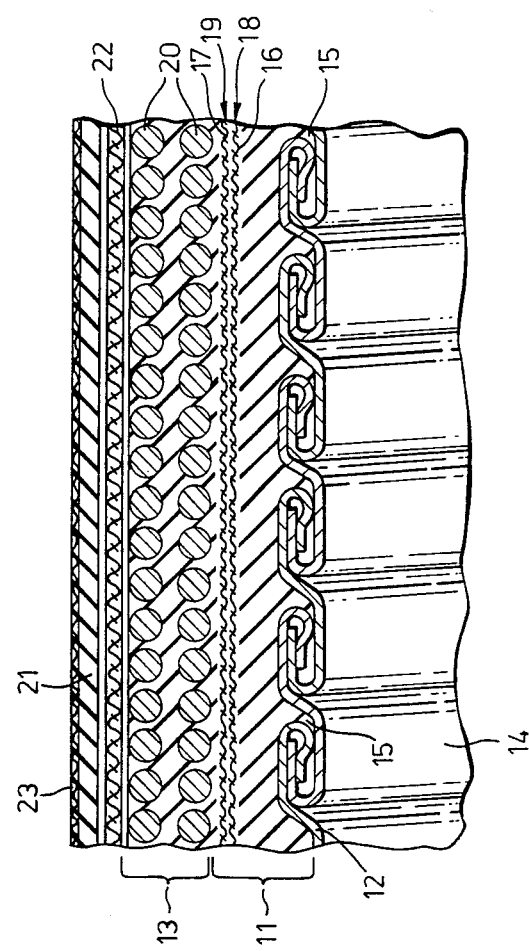

MARINE GROWTH RETARDING HOSE

This application is a continuation of application Ser. No. 094,096, filed Sept. 4, 1987, now abandoned, which is a continuation of application Ser. No. 861,343, filed May 9, 1986, now abandoned.

This invention relates to flexible hose and in particular, though not exclusively, to flexible hose suitable for the transportation of a corrosive fluid such as crude oil under high pressure.

According to the present invention there is provided a flexible hose which comprises as its outermost layer a water-impermeable elastomeric composition having a thickness of at least 0.5 mm containing 0.1% to 10% by weight of particulate copper having a size equivalent to BS 100 mesh or smaller.

By flexible is meant able to be bent to form an arc with a radius less than 20 times the diameter of the bore of the hose. Flexible hoses are easier to lay on the seabed from a barge and for some applications the hose will need to be flexed in use or bent through tight arcs to couple adjacent components of oil rig equipment. To be suitable for use in a flexible hose the elastomeric outermost layer must be suitably elastic. The copper dust-containing elastomer has an elongation at break of at least 200%, and exhibits virtually complete recovery from elongations of 100%. The elastomer should be chosen from a group which excludes those adversely affected by copper and its compounds, for instance, natural rubber is unsuitable, while modified ethylene-propylene, chlorinated polyethylene and chlorosulphonated polyethylene are suitable.

We have found that even a small amount of copper dust when used in the form of minute particles evenly dispersed in the outer cover layer of a hose is sufficient to inhibit marine growth. This is a significant advantage when the hose is used on the seabed as is very often the case with crude oil transportation. Apart from preventing the accumulation of marine growth on the outer surface of the hose, another object of the invention is to prevent certain marine creatures from boring into the hose through the outermost layer which is a well known phenomenon with submarine cables having plastic sheaths as covers. The use of thin protective films, such as can be painted on, are of little use against these creatures which may remove the protective surface before being either discouraged or destroyed. Thicker layers which will persist after such creatures have started to bore into the cover are required. To meet this need the cover has a thickness of at least 0.5 mm, and preferably at least 1.0 mm.

The copper-containing outermost layer of the hose which is very often termed the "cover" will usually be of a vulcanized rubber composition. A reinforcement layer, e.g. of metal or textile, is preferably included in the hose. Preferably the copper particles will be present in an amount of from 0.5 to 5% by weight of the composition. Preferably the cover is bonded to the underlying surface rather than being a loose sleeve because a bonded cover is less likely to become displaced, snagged or turn during installation of the hose.

A BS 100 mesh sieve has a 0.15 mm aperture. Preferably the particulate copper has a size equivalent to BS 200 mesh (aperture size 0.075 mm), more preferably BS 300 mesh (aperture size 0.053 mm or 270 ASTM) or smaller e.g. a BS 325 mesh (aperture size 0.045 mm). In the case of BS 300 mesh particles this means that the diameter of most of the particles will be less than 45 microns. Preferably the area of copper exposed at the exterior surface of the cover is less than 5% of the total surface. This ensures that the copper remains embedded in the elastomer, thus remaining effective.

The resistance of the cover surface to damage (e.g. by scuffing or abrasion) is improved by incorporating a reinforcing layer of, e.g. nylon fabric, in the copper dust-containing cover, so that the fabric is embedded in the outer surface of the hose.

The diameter of the bore of the hose is usually at least 1 inch (2.54 cm) and preferably has a pressure capability of at least 1500 psi (10340 kN/m$^2$) in view of the intended use. By pressure capability is meant the recommended internal working pressure at which the hose can be operated on a regular basis without undue risk of premature failure.

In tests, the incorporation of 0.1% by weight copper dust in the rubber outer cover of a hose has allowed only a light, easily removable surface film of marine growth after a few months whereas a control sample without copper dust in the outer cover had a significant covering of marine growth including crustaceans.

A typical formulation for the hose cover is:

| Material | Parts by Weight |
| --- | --- |
| Rubber polymer | 40 |
| China clay | 20 |
| Low molecular weight polyethylene wax | 0.9 |
| Titanium dioxide pigment | 3.0 |
| Non-extractable plasticiser | 6.0 |
| Stearic acid | 0.6 |
| Copper powder (BS 300 mesh) | 0.9 |
| Colouring pigment | 2.4 |
| Vulcanizing agent | 1.2 |
| Accelerator | 0.3 |

One embodiment of the present invention will now be described, by way of example, with reference to the accompanying diagrammatic drawing which is a longitudinal cross-sectional view of part of a hose in accordance with the present invention.

The hose comprises a liner assembly 11 including a polymeric material such as elastomeric polyacrylate disposed between a radially inner support layer 12 and a radially outer support assembly 13.

The inner support layer 12 is formed from a single double folded helically wound strip 14 arranged with successive turns thereof in interlocked relationship.

The interlocked strip 14 defines in the radially outer surface of the inner layer 12 a helically extending crevice 15. Preferably the strip and crevice are of a kind as described in more detail in the specification of U.K. patent publication No. 2167521A and its corresponding U.S. application Ser. No. 680,474 of Dec. 11, 1984.

Extruded around the inner layer 12 in a manner so as to completely fill the crevice 15 is the polymeric liner layer 11 of elastomeric polyacrylate. This layer is formed by a two-stage extrusion process. In a first stage a substantial proportion of the overall thickness of the liner material is applied, then a plurality of high tenacity rayon yarns are wound helically around the part-formed liner layer. The rayon yarns are wound in such a manner as to form two layers, the yarns 16 in one layer 18 extending with a left-hand twist relative to the direction of the length of the hose and the yarns 17 of the other layer 19 extending with a right-hand twist relative to the direction of the length of the hose. Subsequent to winding of the yarns 16,17 a thin layer of elastomeric polyacrylate is extruded over the layers 18,19 which thereby are substantially wholly embedded in said material.

The outer support assembly 13 comprises, embedded in elastomeric material, two layers of high tensile reinforcement wire each comprising helically wound multi-filament wire cords 20 of outer diameter 6 mm, the cords of one layer extending relative to the length of the hose in an opposite sense to the cords of the other layer of the pair. The wires forming each cord 20 preferably are of an aluminium clad type such as is the subject of U.K. patent publication No. 2163513A and its corresponding U.S. application Ser. No. 924,139 of Oct. 27, 1986.

External of the outer support assembly 13 there is provided a fabric breaker layer 22 and an abrasion resistant neoprene cover layer 21.

The cover layer 21 contains copper particles disposed within it and a nylon fabric layer 23 embedded in the outer surface of the cover. This fabric layer 23 improves the resistance of the cover to damage e.g. from scuffing or abrasion.

I claim:

1. A flexible reinforced hose for use in seawater and having a bore of at least one inch wherein said hose includes a reinforcement layer and a protective outer layer of a water impermeable elastomeric composition surrounding said reinforcement layer to inhibit marine growth on the hose and to inhibit marine boring into the hose, said protective outer layer including to a radial depth of at least 0.5 mm a substantially even distribution of particulate copper of a size equivalent of BS 100 mesh or smaller in an amount of from 0.1% to 10% by weight with the particulate copper containing elastomer having an elongation at break of at least 200%.

2. A flexible hose according to claim 1 wherein the particulate copper is of a size equivalent to BS 200 mesh or smaller.

3. A flexible hose according to claim 1 wherein the particulate copper is of a size equivalent to BS 300 mesh or smaller.

4. A flexible hose according to claim 1 wherein the water-impermeable elastomeric composition contains from 0.5% by 5% by weight of particulate copper.

5. A flexible hose according to claim 1 wherein the thickness of the water-impermeable elastomeric composition is at least 1 mm.

6. A flexible hose according to claim 1 wherein the area of copper exposed at the exterior surface of the protective outer layer is less than 5% of the total surface.

7. A flexible hose according to claim 1 wherein a reinforcing layer is embedded in the surface of the protective outer layer.

8. A flexible hose according to claim 1 wherein the elastomeric composition is a vulcanized rubber composition.

9. A flexible hose according to claim 1 wherein it is used to transport corrosive fluid.

10. A flexible hose according to claim 1 wherein it is submerged in seawater during use.

11. A flexible hose according to claim 1 wherein the pressure capability of the hose is at least 1500 psi (10340 kN/m$^2$).

* * * * *